United States Patent
Jung

(10) Patent No.: US 12,403,901 B2
(45) Date of Patent: Sep. 2, 2025

(54) VEHICLE COLLISION AVOIDANCE DEVICE AND METHOD THEREFOR

(71) Applicants: HYUNDAI MOTOR COMPANY, Seoul (KR); KIA CORPORATION, Seoul (KR)

(72) Inventor: Ho Choul Jung, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 248 days.

(21) Appl. No.: 18/110,187

(22) Filed: Feb. 15, 2023

(65) Prior Publication Data

US 2024/0067170 A1 Feb. 29, 2024

(30) Foreign Application Priority Data

Aug. 25, 2022 (KR) .................. 10-2022-0106996

(51) Int. Cl.
*B60W 30/095* (2012.01)
*B60W 30/09* (2012.01)
*B60W 50/14* (2020.01)

(52) U.S. Cl.
CPC ........ *B60W 30/0956* (2013.01); *B60W 30/09* (2013.01); *B60W 50/14* (2013.01); *B60W 2050/146* (2013.01); *B60W 2420/403* (2013.01); *B60W 2420/408* (2024.01); *B60W 2554/20* (2020.02); *B60W 2554/4041* (2020.02); *B60W 2554/80* (2020.02)

(58) Field of Classification Search
None
See application file for complete search history.

(56) References Cited

U.S. PATENT DOCUMENTS

| 9,650,026 | B2 * | 5/2017 | Zeng | B60T 17/18 |
| 11,220,213 | B2 * | 1/2022 | Umezane | B60R 1/26 |
| 11,840,220 | B2 * | 12/2023 | Jung | B60W 10/20 |
| 2020/0282983 | A1 * | 9/2020 | Ito | B60T 7/12 |

\* cited by examiner

*Primary Examiner* — Todd Melton
(74) *Attorney, Agent, or Firm* — Lempia Summerfield Katz LLC

(57) ABSTRACT

A vehicle collision avoidance device and a method therefor are provided. The vehicle collision avoidance device includes: a camera that captures a rear side image of a vehicle; a radar that recognizes an object present at a rear side of the vehicle; and at least one processor electrically connected to the camera and the radar. The at least one processor: determines whether there is a static object at the rear side of the vehicle; determines a position of the static object present at the rear side of the vehicle; determines an empty space present in the direction of travel of the vehicle, based on the rear side image obtained by the camera and the position of the static object; and determines whether to warn of a collision, based on a moving object and the static object, when the moving object is detected.

20 Claims, 10 Drawing Sheets

VEHICLE COLLISION AVOIDANCE DEVICE AND METHOD THEREFOR

CROSS-REFERENCE TO RELATED APPLICATION

This application claims the benefit of priority to Korean Patent Application No. 10-2022-0106996, filed in the Korean Intellectual Property Office on Aug. 25, 2022, the entire contents of which are incorporated herein by reference.

TECHNICAL FIELD

The present disclosure relates to a vehicle collision avoidance device and a method therefor. More particularly, the present disclosure relates to technologies of determining whether to warn of a collision based on an image obtained by means of a camera.

BACKGROUND

A rear cross-traffic collision warning (RCCW) system is a driving assistance device that provides a driver with information when detecting left and right approaching vehicles when the vehicle is reversing using a radar sensor.

Furthermore, a rear cross-traffic collision-avoidance assist (RCCA) system is a driving assistance device that controls the braking of the brake when the risk of a collision is determined while a rear cross-traffic collision warning is generated. The RCCA also notifies a driver that the control is generated by means of an instrument panel display when the control is generated.

Even in a situation where there is a static object such as a pillar or a vehicle in the direction of travel of the vehicle, when an object at a rear side outside the direction of travel of the vehicle is moving, a false warning frequently occurs in the radar-based rear cross-traffic collision warning.

SUMMARY

The present disclosure has been made to solve the above-mentioned problems occurring in the prior art while advantages achieved by the prior art are maintained intact.

An aspect of the present disclosure provides a vehicle collision avoidance device for preventing a collision by recognizing a free space (i.e., an empty space) that is present in the direction of travel of the vehicle by means of camera recognition and a method therefor.

Another aspect of the present disclosure provides a vehicle collision avoidance device for preventing a false warning when detecting a moving object by recognizing a static object that is present in the direction of travel of the vehicle by means of camera recognition and a method therefor.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle collision avoidance device may include: a camera that captures a rear side image of a vehicle; a radar that recognizes an object present at a rear side of the vehicle; and at least one processor electrically connected to the camera and the radar. The at least one processor may: determine whether there is a static object at the rear side of the vehicle, based on the rear side image obtained by means of the camera (i.e., by the camera); determine a position of the static object at the rear side of the vehicle when the static object is determined to be at the rear side of the vehicle; determine an empty space present in a direction of travel of the vehicle, based on the rear side image obtained by means of the camera and the position of the static object; and determine whether to warn of a collision, based on a moving object outside the empty space and the static object, when the moving object is detected.

In an embodiment, the at least one processor may determine not to warn of the collision when a distance from the static object is less than a distance from the moving object. The at least one processor may also determine to warn of the collision when the distance from the static object is greater than the distance from the moving object.

In an embodiment, the at least one processor may determine a reversible space in the empty space, the reversible space being a minimum area in which the vehicle is able to travel, the minimum area overlapping a traveling trajectory of the vehicle. The at least one processor also may determine to warn of the collision when the moving object is determined to be able to enter the reversible space. The at least one processor also may determine not to warn of the collision when the moving object is determined to be unable to enter the reversible space.

In an embodiment, the at least one processor may determine the reversible space of the vehicle based on a speed of the vehicle when it is determined that there is no static object at the rear side of the vehicle.

In an embodiment, the vehicle collision avoidance device may further include a brake system. The at least one processor may control the brake system to brake when it is determined that the moving object is able to enter the reversible space. The at least one processor also may control the brake system not to brake when it is determined that the moving object is unable to enter the reversible space.

In an embodiment, the at least one processor may determine whether the static object is at the rear side of the vehicle, based on the rear side image obtained by means of the camera, when a gear of the vehicle is set to a reverse I stage and when a speed of the vehicle is within a specified range.

In an embodiment, the at least one processor may determine whether to warn of the collision, based on the moving object and the static object, when a speed of the moving object is greater than or equal to a threshold.

In an embodiment, the at least one processor may convert the rear side image obtained by means of the camera to obtain a top-view image and may determine whether the static object is at the rear side of the vehicle based on image segmentation in the top-view image.

In an embodiment, the at least one processor may perform sensor fusion of a rear side image collected in real-time by means of the camera and data collected in real-time by means of the radar and may determine a position of at least one of the static object present at the rear side of the vehicle, the moving object, or a combination thereof.

In an embodiment, the vehicle collision avoidance device may further include an output device. The at least one processor may control the output device to output a warning when it is determined to warn of the collision (i.e., when the at least one processor determines to warn of the collision). The output device may include at least one of a cluster, displays provided in side mirrors, a speaker, or a combination thereof.

According to another aspect of the present disclosure, a vehicle collision avoidance method may include: determining, by at least one processor, whether there is a static object at a rear side of a vehicle based on a rear side image obtained by means of a camera; determining, by the at least one processor, a position of the static object at the rear side of the vehicle when the static object is determined to be at the rear side of the vehicle; determining, by the at least one processor, an empty space present in a direction of travel of the vehicle, based on the rear side image obtained by means of the camera and the position of the static object; and determining, by the at least one processor, whether to warn of a collision, based on a moving object outside the empty space and the static object, when the moving object is detected.

In an embodiment, the vehicle collision avoidance method may further include: determining, by the at least one processor, not to warn of the collision when a distance from the static object is less than a distance from the moving object; and determining, by the at least one processor, to warn of the collision when the distance from the static object is greater than the distance from the moving object.

In an embodiment, the determining of whether to warn of the collision may include: determining, by the at least one processor, a reversible space in the empty space, the reversible space being a minimum area in which the vehicle is able to travel, the minimum area overlapping a traveling trajectory of the vehicle; determining, by the at least one processor, to warn of the collision when the moving object is determined to be able to enter the reversible space; and determining, by the at least one processor, not to warn of the collision when the moving object is determined to be unable to enter the reversible space.

In an embodiment, the vehicle collision avoidance method may further include determining, by the at least one processor, the reversible space of the vehicle based on a speed of the vehicle when it is determined that there is no static object at the rear side of the vehicle.

In an embodiment, the vehicle collision avoidance method may further include: controlling, by the at least one processor, a brake system to brake when it is determined that the moving object is able to enter the reversible space; and controlling, by the at least one processor, the brake system not to brake when it is determined that the moving object is unable to enter the reversible space.

In an embodiment, the determining of whether the static object is at the rear side of the vehicle may include determining, by the at least one processor, whether the static object is at the rear side of the vehicle, based on the rear side image obtained by means of the camera, when a gear of the vehicle is set to a R) stage and when a speed of the vehicle is within a specified range.

In an embodiment, the determining of whether to warn of the collision may include determining, by the at least one processor, whether to warn of the collision, based on the moving object and the static object, when a speed of the moving object is greater than or equal to a threshold.

In an embodiment, the determining of whether the static object is at the rear side of the vehicle may include converting, by the at least one processor, the rear side image obtained by means of the camera to obtain a top-view image and determining, by the at least one processor, whether the static object is at the rear side of the vehicle by performing image segmentation in the top-view image.

In an embodiment, the vehicle collision avoidance method may further include performing, by the at least one processor, sensor fusion of a rear side image collected in real-time by means of the camera and data collected in real-time by means of a radar and determining, by the at least one processor, a position of at least one of the static object present at the rear side of the vehicle, the moving object, or a combination thereof.

In an embodiment, the vehicle collision avoidance method may further include controlling, by the at least one processor, an output device to output a warning when it is determined to warn of the collision (i.e., when the at least one processor determines to warn of the collision). The output device may include at least one of a cluster, displays provided in side mirrors, a speaker, or a combination thereof.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
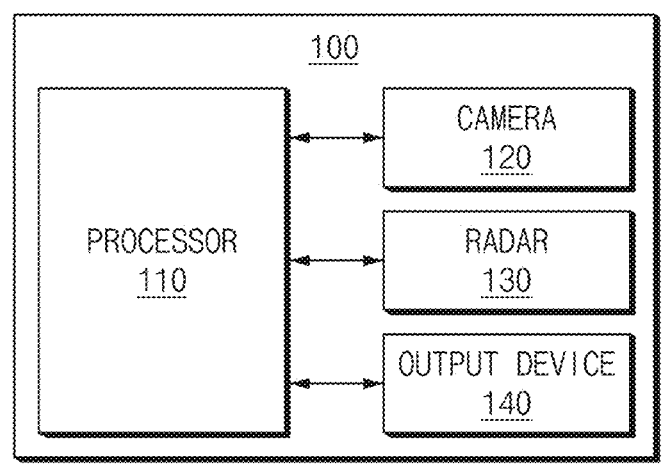
FIG. 1 is a block diagram of a vehicle collision avoidance device according to an embodiment of the present disclosure.

Hereinafter, some embodiments of the present disclosure are described in detail with reference to the drawings. In the drawings, the same reference numerals are used throughout to designate the same or equivalent elements. In addition, a detailed description of well-known features or functions has been ruled out in order not to unnecessarily obscure the gist of the present disclosure.

In describing the components of embodiments according to the present disclosure, terms such as "first," "second," "A," "B," "(a)," "(b)," and the like, may be used. These terms are only used to distinguish one element from another element and do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art and should not be interpreted as having ideal or excessively formal meanings unless clearly defined as having such in the present application.

Hereinafter, embodiments of the present disclosure are described in detail with reference to FIGS. 1-10.

FIG. 1 is a block diagram of a vehicle collision avoidance device 100 according to an embodiment of the present disclosure.

Referring to FIG. 1, the vehicle collision avoidance device 100 according to an embodiment may include a processor 110, a camera 120, a radar 130, and an output device 140. In various embodiments, the vehicle collision avoidance device 100 may include an additional component other than the components shown in FIG. 1 or may omit at least one of the components shown in FIG. 1.

According to an embodiment, the processor 110 may be electrically connected to the camera 120, the radar 130, and the output device 140. The processor 110 also may electrically control the respective components. The processor 110 may be an electrical circuit which executes instructions of software and may perform a variety of data processing and calculation described below.

According to an embodiment, the processor 110 may include, for example, an electronic control unit (ECU), a microcontroller unit (MCU), or another sub-controller, which is loaded into the vehicle.

According to an embodiment, the processor 110 may execute calculation and data processing about control and/or communication of at least one other component of the vehicle collision avoidance device 100 using instructions stored in a memory (not shown). Detailed contents associated with an operation of the processor 110 are described below with reference to FIGS. 3-5.

According to an embodiment, the camera 120 may be a module loaded into the vehicle to capture an image around the vehicle, which may include a front-view camera, a rear-view camera, and a rear side-view camera.

According to an embodiment, the camera 120 may obtain a rear side image of the vehicle.

According to an embodiment, the radar 130 may sense whether there is a surrounding object. According to an embodiment, the radar 130 may measure a distance between the vehicle and the surrounding object.

According to an embodiment, the radar 130 may generate an electromagnetic wave around and may receive an electromagnetic wave reflected from a surrounding object to identify a distance from the surrounding object, a direction of the surrounding object, an altitude of the surrounding object, and the like. For example, the surrounding object may include a surrounding vehicle or a pedestrian.

According to an embodiment, the output device 140 may output information under an instruction of the processor 110.

According to an embodiment, the output device 140 may include at least one of a liquid crystal display (LCD), a thin film transistor-liquid crystal display (TFT-LCD), an organic light-emitting diode (OLED) display, a flexible display, a three-dimensional (3D) display, a transparent display, a head-up display (HUD), displays provided in side mirrors, a touch screen, a cluster, or a combination thereof.

According to an embodiment, the output device 140 may include a sound output module, such as a speaker, which is capable of outputting audio data.

According to an embodiment, the output device 140 may be implemented as a touch screen coupled to a touch sensor to be used as an input device. For example, a touch film, a touchpad, or the like, may be used as the touch sensor.

Figure 2:
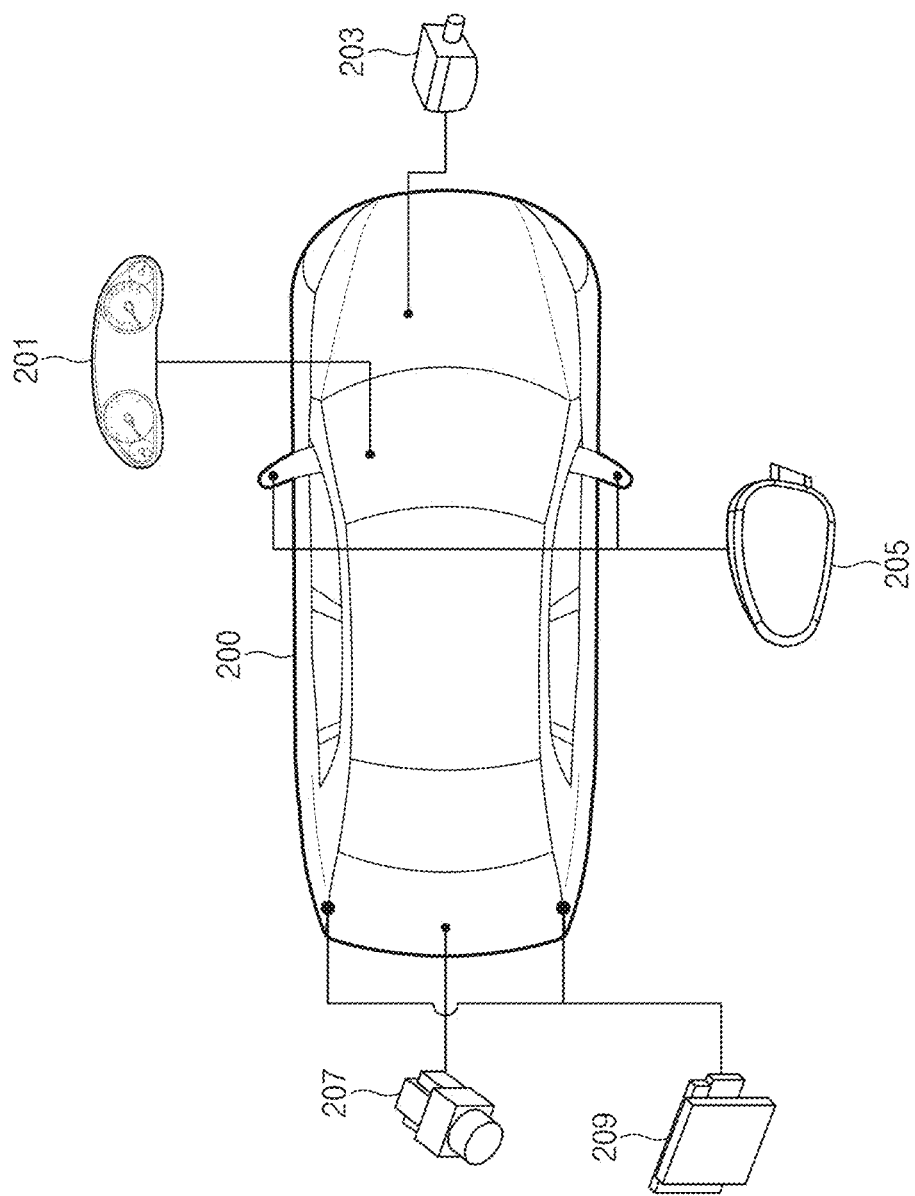
FIG. 2 illustrates determining whether to warn of a collision using a camera and a radar in a vehicle collision avoidance device and a method therefor according to an embodiment of the present disclosure.

FIG. 2 illustrates determining whether to warn of a collision using a camera and a radar in a vehicle collision avoidance device and a method therefor according to an embodiment of the present disclosure.

Referring to FIG. 2, in the vehicle collision avoidance device and the method therefor according to an embodiment, a vehicle 200 may include a cluster 201, an electronic stability control (ESC) 203, side mirrors 205, a camera 207, and a radar 209.

In various embodiments, the vehicle 200 in the vehicle collision avoidance device and the method therefor may include an additional component other than the components shown in FIG. 2 or may omit at least one of the components shown in FIG. 2.

According to an embodiment, the vehicle 200 may obtain a rear side image of the vehicle 200 by means of the camera 207.

According to an embodiment, the vehicle 200 may determine whether there is a static object at a rear side of the vehicle 200, based on the rear side image obtained by means of the camera 207.

According to an embodiment, the vehicle 200 may detect whether there is a surrounding object, based on information obtained from the radar 209.

According to an embodiment, the radar 209 may measure a distance between the vehicle 200 and the surrounding object.

According to an embodiment, the radar 209 may generate electromagnetic waves around and may receive electromagnetic waves reflected from a surrounding object to identify a distance from the surrounding object, a direction of the surrounding object, an altitude of the surrounding object, and the like. For example, the surrounding object may include a surrounding vehicle or a pedestrian.

According to an embodiment, when there is a static object at the rear side of the vehicle 200, the vehicle 200 may determine a position of the static object.

For example, the vehicle 200 may perform sensor fusion of the rear side image collected in real-time by means of the camera 207 and the data collected in real-time by means of the radar 209 to determine the position of the static object that is present at the rear side of the vehicle 200.

According to an embodiment, the vehicle 200 may determine a free space (i.e., empty space) that is present in the direction of travel of the vehicle 200, based on the rear side image obtained by means of the camera 207 and the position of the static object.

According to an embodiment, when a moving object outside the empty space is detected, the vehicle 200 may determine whether to warn of a collision, based on the moving object and the static object.

For example, when a distance from the static object is less than a distance from the moving object, the vehicle 200 may determine not to warn of the collision.

In another example, when the distance from the static object is greater than the distance from the moving object, the vehicle 200 may determine to warn of the collision.

According to an embodiment, when it is determined to warn of the collision, the vehicle 200 may control the ESC 203 to brake.

According to an embodiment, when it is determined not to warn of the collision, the vehicle 200 may control the ESC 203 not to brake.

According to an embodiment, when it is determined to warn of the collision, the vehicle 200 may output a warning through at least one of the cluster 201, displays provided in the side mirrors 205, a speaker (not shown), or a combination thereof.

For example, when it is determined to warn of the collision, the vehicle 200 may output a warning through the cluster 201.

Furthermore, for example, when it is determined to warn of the collision, the vehicle 200 may turn on/off warning indicators displayed on the side mirrors 205.

Furthermore, for example, when it is determined to warn of the collision, the vehicle 200 may output a warning sound through the speaker (not shown).

Figure 3:
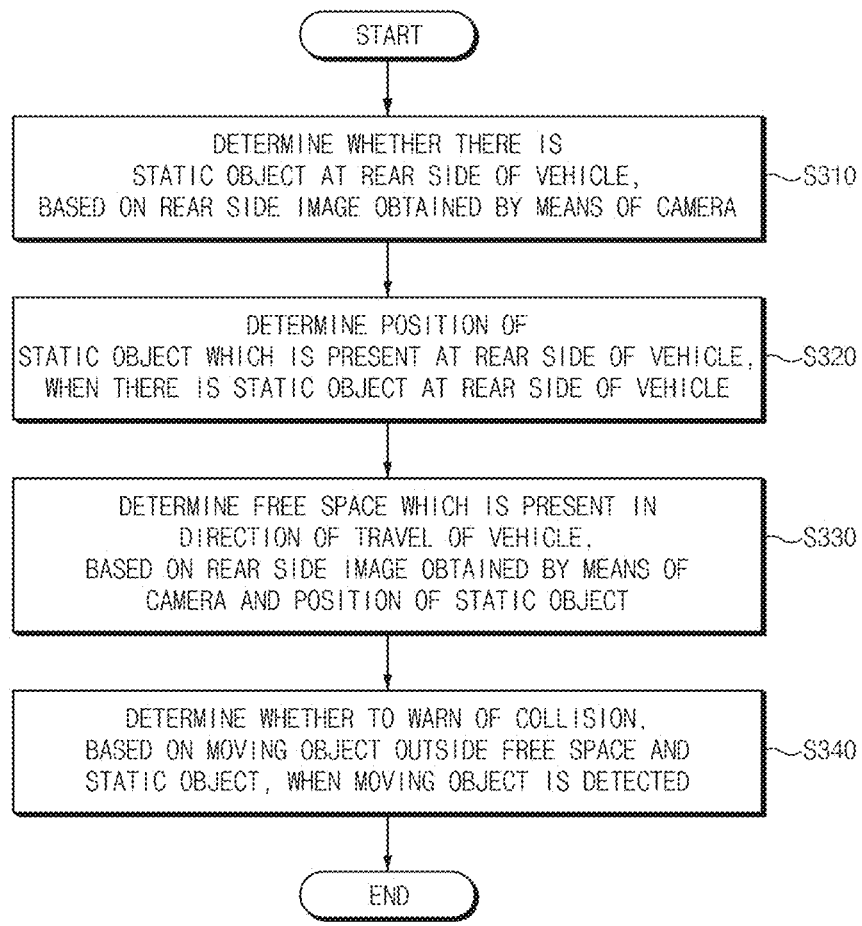
FIG. 3 is a flowchart illustrating a vehicle collision avoidance method according to an embodiment of the present disclosure.

FIG. 3 is a flowchart illustrating a vehicle collision avoidance method according to an embodiment of the present disclosure.

Operations in S310 to S340 in an embodiment below may be sequentially performed but are not necessarily sequentially performed. For example, an order of the respective operations may be changed, and at least two operations may be performed in parallel.

Referring to FIG. 3, in the vehicle collision avoidance method according to an embodiment, in S310, a processor may determine whether there is a static object at a rear side of a vehicle, based on a rear side image obtained by means of a camera.

According to an embodiment, the processor may obtain an image around the vehicle by means of the camera.

For example, the processor may obtain a rear side image of the vehicle by means of a rear-view camera.

According to an embodiment, the processor may obtain a rear side image of the vehicle by means of the rear-view camera, in response to the gear of the vehicle being set to the reverse (R) stage.

According to an embodiment, the processor may determine whether the static object is at the rear side of the vehicle based on the rear side image obtained by means of the camera.

According to an embodiment, when the gear of the vehicle is set to the R stage and when the speed of the vehicle is within a specified range, the processor may determine whether the static object is at the rear side of the vehicle, based on the rear side image obtained by means of the camera.

According to an embodiment, the processor may convert the rear side image obtained by means of the camera to obtain a top-view image.

According to an embodiment, the processor may perform image segmentation in the top-view image to determine whether there is the static object at the rear side of the vehicle.

According to an embodiment, when the static object is at the rear side of the vehicle, in S320, the processor may determine a position of the static object that is present at the rear side of the vehicle.

According to an embodiment, when the static object is at the rear side of the vehicle, the processor may determine the position of the static object.

According to an embodiment, the processor may perform sensor fusion of the rear side image collected in real-time by means of the camera and the data collected in real-time by means of the radar to determine the position of the static object.

According to an embodiment, in S330, the processor may determine an empty space that is present in the direction of travel of the vehicle, based on the rear side image obtained by means of the camera and the position of the static object.

According to an embodiment, the processor may recognize an empty space (e.g., a drivable space), based on the rear side image obtained by means of the camera and the position of the static object.

For example, the processor may determine a drivable space based on a position of a vehicle, a pedestrian, an obstacle, or the like.

According to an embodiment, when a moving object outside the empty space is detected, in S340, the processor may determine whether to warn of a collision, based on the moving object and the static object.

According to an embodiment, the processor may detect the moving object, based on the rear side image obtained by means of the camera.

According to an embodiment, the processor may perform sensor fusion of the rear side image collected in real-time by means of the camera and the data collected in real-time by means of the radar to determine the position of the moving object.

According to an embodiment, the processor may detect the moving object outside the empty space, based on the camera and the radar.

According to an embodiment, the processor may determine whether to warn of a collision, based on the moving object and the static object.

According to an embodiment, the processor may determine whether to warn of a collision, based on a distance from the moving object and a distance from the static object.

For example, when the distance from the static object is less than the distance from the moving object, the processor may determine not to warn of the collision.

In another example, when the distance from the static object is greater than the distance from the moving object, the processor may determine to warn of the collision.

According to an embodiment, the processor may determine a reversible space that is a minimum area, which overlaps a traveling trajectory of the vehicle, in which the vehicle is able to travel, in the empty space. In other words, the processor may determine a reversible space in the empty space, the reversible space being a minimum area in which the vehicle is able to travel, the minimum area overlapping the traveling trajectory of the vehicle.

According to an embodiment, when it is determined that the moving object is able to enter the reversible space, the processor may determine to warn of the collision.

According to an embodiment, when it is determined that the moving object is unable to enter the reversible space, the processor may determine not to warn of the collision.

Figure 4B:
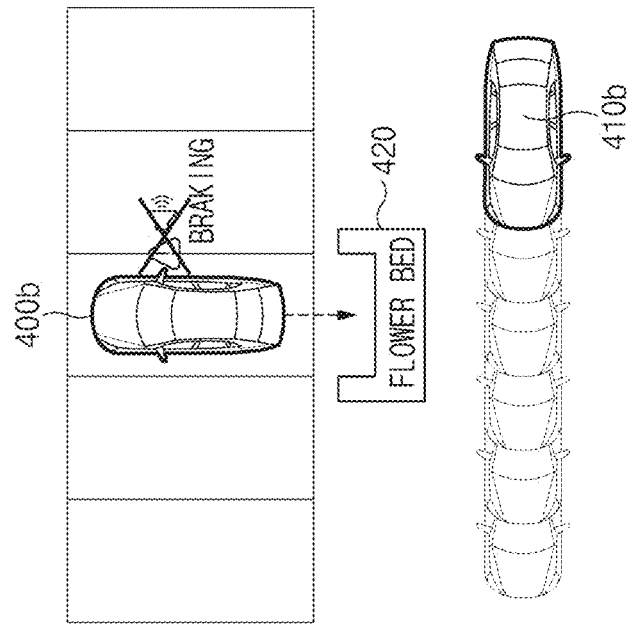
FIGS. 4A and 4B illustrate an example of determining whether to warn of a collision when detecting a vehicle movement object in a vehicle collision avoidance device and a method therefor according to an embodiment of the present disclosure.
Figure 4A:
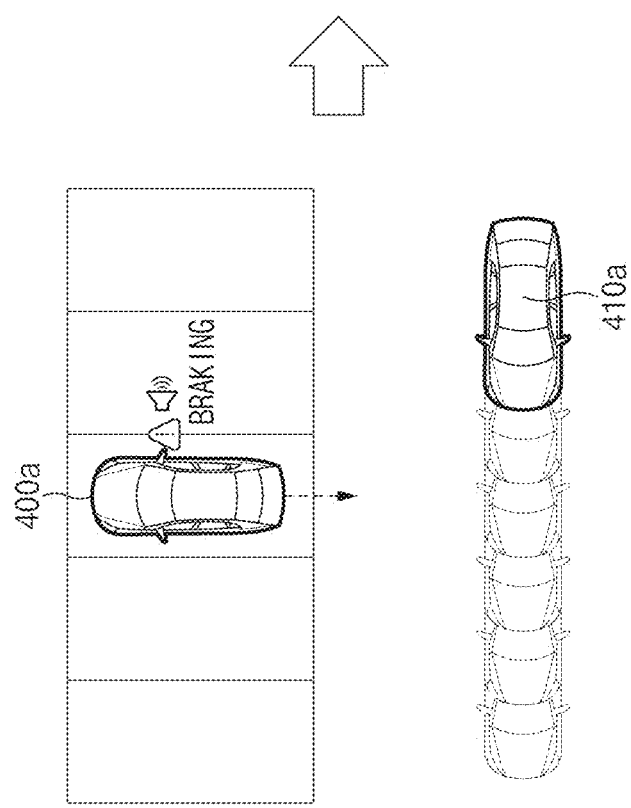

FIGS. 4A and 4B illustrate an example of determining whether to warn of a collision when detecting a vehicle movement object in a vehicle collision avoidance device and a method therefor according to an embodiment of the present disclosure. Contents of FIGS. 4A and 4B, which correspond to or are duplicated with the contents described above in conjunction with contents of FIGS. 1-3, may be briefly described or omitted.

Referring to FIG. 4A, in the vehicle collision avoidance device and the method therefor according to an embodiment, a vehicle 400a may determine that there is no static object at a rear side of the vehicle 400a, based on a rear side image obtained by means of its camera.

According to an embodiment, the vehicle 400a may detect a moving object 410a, based on the rear side image obtained by means of the camera.

According to an embodiment, in a state where the gear is set to the R stage, when the moving object 410a is detected at the rear side of the vehicle 400a, the vehicle 400a may output a warning about a collision through its output device.

For example, the output device may include at least one of a cluster, displays provided in side mirrors, a speaker, or a combination thereof.

Referring to FIG. 4B, in the vehicle collision avoidance device and the method therefor according to an embodiment, a vehicle 400b may determine that there is a static object 420 at a rear side of the vehicle 400b, based on a rear side image obtained by means of its camera.

According to an embodiment, the vehicle 400b may perform sensor fusion of the rear side image obtained by means of the camera and data obtained by means of a radar to determine a position of the static object 420 that is present at the rear side of the vehicle 400b.

According to an embodiment, the vehicle 400b may also detect a moving object 410b, based on the rear side image obtained by means of the camera.

According to an embodiment, the vehicle 400b may perform sensor fusion of the rear side image obtained by means of the camera and the data obtained by means of the radar to determine a position of the moving object 410b that is present at the rear side of the vehicle 400b.

According to an embodiment, the vehicle 400b may determine whether to warn of a collision, based on the moving object 410b and the static object 420.

For example, in a state where the gear is set to the R stage, when it is determined that a distance from the moving object 410b is shorter than a distance from the static object 420, the vehicle 400b may output a warning through its output device.

In another example, in the state where the gear is set to the R stage, when it is determined that the distance from the moving object 410b outside an empty space is longer than the distance from the static object 420, the vehicle 400b may fail to output a warning through the output device.

Figure 5:
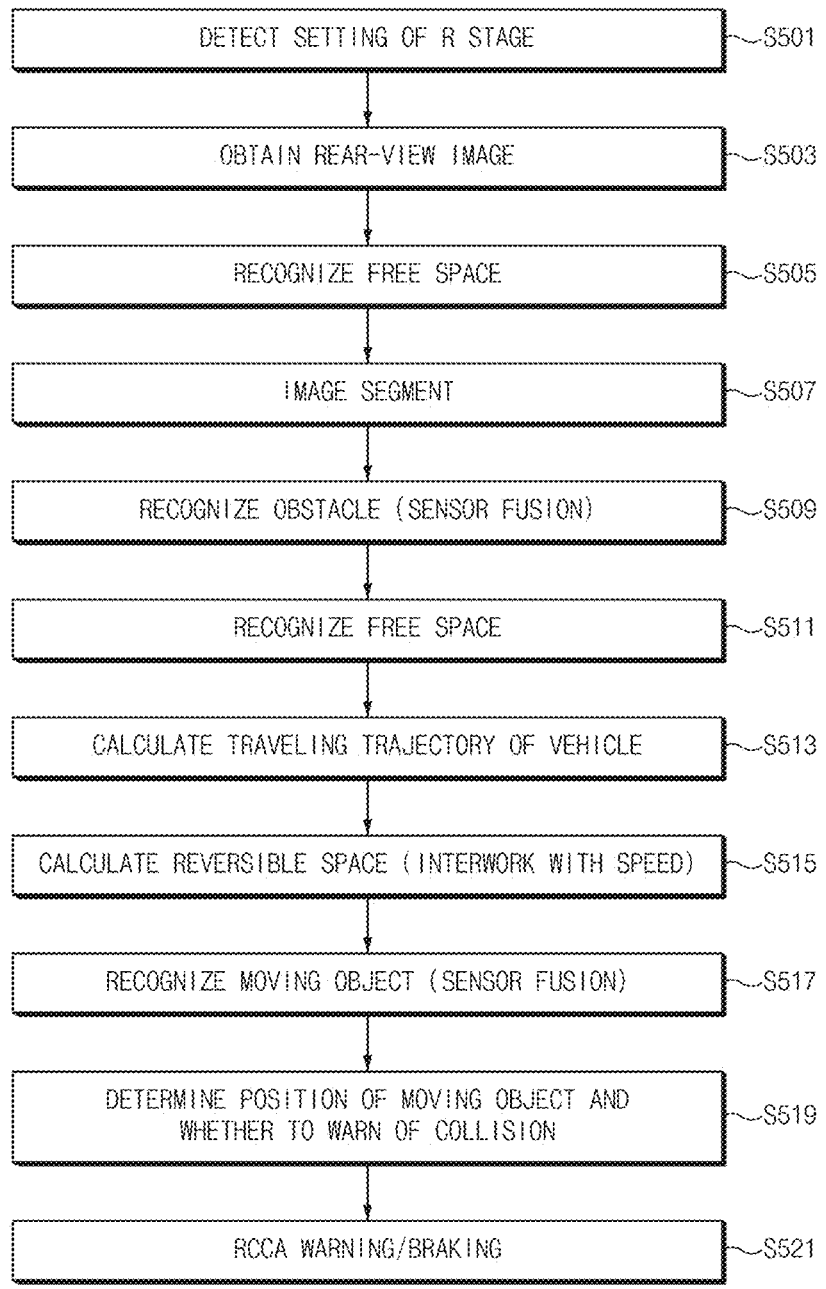
FIG. 5 is a flowchart illustrating controlling warning and braking based on a static object and a moving object in a vehicle collision avoidance device and a method therefor according to an embodiment of the present disclosure.

FIG. 5 is a flowchart illustrating controlling warning and braking based on a static object and a moving object in a vehicle collision avoidance device and a method therefor according to an embodiment of the present disclosure.

Operations in S501 to S521 in an embodiment below may be sequentially performed but are not necessarily sequentially performed. For example, an order of the respective operations may be changed, and at least two operations may be performed in parallel.

Referring to FIG. 5, in the vehicle collision avoidance device and the method therefor according to an embodiment, in S501, a processor may detect that a gear of a vehicle is set to the R stage.

According to an embodiment, the processor may determine whether the vehicle is parked backwards. For example, the processor may detect that the gear of the vehicle is set to the R stage.

According to an embodiment, in the state where the gear of the vehicle is set to the R stage, the processor may determine whether the speed of the vehicle is within a specified range (e.g., 0 kilometers per hour (km/h) to 8 km/h).

According to an embodiment, in S503, the processor may obtain a rear-view image of the vehicle by means of a camera.

According to an embodiment, in the state where the gear of the vehicle is set to the R stage, when the speed of the vehicle is within the specified range (e.g., 0 km/h to 8 km/h), the processor may obtain the rear-view image of the vehicle by means of the camera.

According to an embodiment, in S505, the processor may convert the rear-view image of the vehicle into a top-view image.

According to an embodiment, the processor may convert the rear-view image obtained from the camera into a rear top-view image.

According to an embodiment, in S507, the processor may perform image segmentation in the top-view image.

According to an embodiment, the processor may perform deep learning-based image segmentation in the top-view image.

According to an embodiment, in S509, the processor may recognize an obstacle at a rear side of the vehicle.

According to an embodiment, the processor may recognize an obstacle that is present at the rear side of the vehicle using clustering information obtained by means of the image segmentation.

According to an embodiment, the processor may perform sensor fusion of the obstacle recognized by means of the camera and an obstacle recognized by means of a radar.

According to an embodiment, in S511, the processor may recognize an empty space.

According to an embodiment, the processor may recognize an empty space (e.g., a drivable space), based on the rear side image obtained by means of the camera and the position of the static object.

For example, the processor may determine an empty space based on a position of a vehicle, a pedestrian, an obstacle, or the like.

According to an embodiment, in S513, the processor may calculate a traveling trajectory (or a driving trajectory) of the vehicle.

According to an embodiment, the processor may calculate a traveling trajectory of the vehicle using a sensor provided in the vehicle. For example, the sensor provided in the vehicle may include at least one of a steering wheel motion sensor, a distance sensor, a position sensor, or a combination thereof.

According to an embodiment, in S515, the processor may calculate a reversible space.

According to an embodiment, the processor may calculate the reversible space, based on the calculated traveling trajectory of the vehicle.

According to an embodiment, the processor may determine the reversible space, which is a minimum area overlapping the traveling trajectory of the vehicle, in which the vehicle is able to travel, in the empty space.

According to an embodiment, when it is determined that there is no obstacle at the rear side of the vehicle, the processor may determine the reversible space of the vehicle based on the speed of the vehicle.

According to an embodiment, in S517, the processor may recognize a moving object.

According to an embodiment, the processor may recognize a moving object that is present at the rear side of the vehicle using clustering information obtained by means of the image segmentation.

According to an embodiment, the processor may perform sensor fusion of the obstacle recognized by means of the camera and the obstacle recognized by means of the radar to identify a position of the moving object.

According to an embodiment, in S519, the processor may determine a position of the moving object and whether to warn of a collision.

According to an embodiment, the processor may determine the position of the moving object.

According to an embodiment, when it is determined that the moving object is able to enter the reversible space, the processor may determine to warn of the collision.

According to an embodiment, when it is determined that the moving object is unable to enter the reversible space, the processor may determine not to warn of the collision.

According to an embodiment, in S521, the processor may control rear cross-traffic collision-avoidance assist (RCCA) warning and braking.

According to an embodiment, when it is determined that the moving object is able to enter the reversible space, the processor may control RCCA to output a warning.

According to an embodiment, when it is determined that the moving object is able to enter the reversible space, the processor may control the RCCA to brake.

According to an embodiment, when it is determined that the moving object is able to enter the reversible space, the processor may control the RCCA not to warn of the collision.

According to an embodiment, when it is determined that the moving object is able to enter the reversible space, the processor may control the RCCA not to brake.

Figure 6:
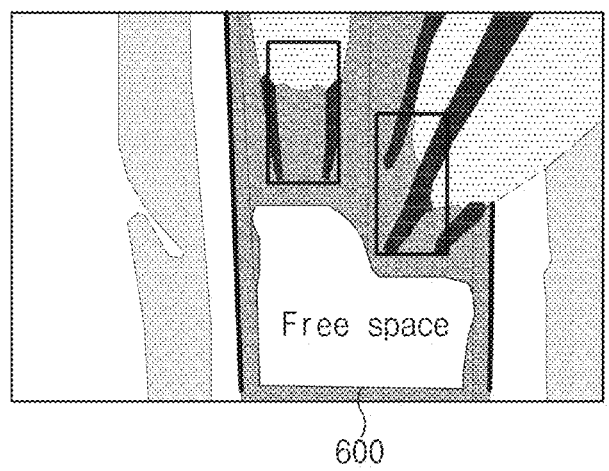
FIG. 6 illustrates an example of recognizing a free space (i.e., an empty space) using a rear side image of a vehicle in a vehicle collision avoidance device and a method therefor according to an embodiment of the present disclosure.

FIG. 6 illustrates an example of recognizing a free space (i.e., empty space) using a rear side image of a vehicle in a vehicle collision avoidance device and a method therefor according to an embodiment of the present disclosure.

Referring to FIG. 6, in the vehicle collision avoidance device and the method therefor according to an embodiment, the processor may recognize an empty space 600, based on a rear side image obtained by means of a camera and a position of a static object.

According to an embodiment, the empty space 600 may include a space in which the vehicle is able to travel. For example, the empty space 600 may include a space, which does not overlap a position of a static object, in which the vehicle is able to travel.

In detail, the processor may determine the empty space 600 based on a position of a vehicle, a pedestrian, an obstacle, or the like.

According to an embodiment, the processor may determine a reversible space that is a minimum area, which overlaps a traveling trajectory of the vehicle, in which the vehicle is able to travel, in the empty space 600.

According to an embodiment, when it is determined that there is no obstacle at the rear side of the vehicle, the processor may determine a reversible space of the vehicle based on the speed of the vehicle.

Figure 7A:
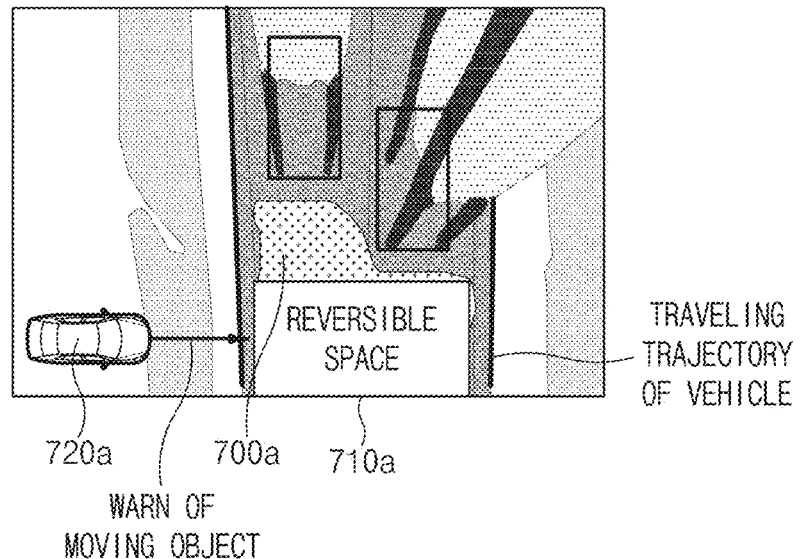
FIGS. 7A and 7B illustrate an example of determining whether it is possible for a moving object to enter a reversible space using a rear side image of a vehicle in a vehicle collision avoidance device and a method therefor according to an embodiment of the present disclosure.
Figure 7B:
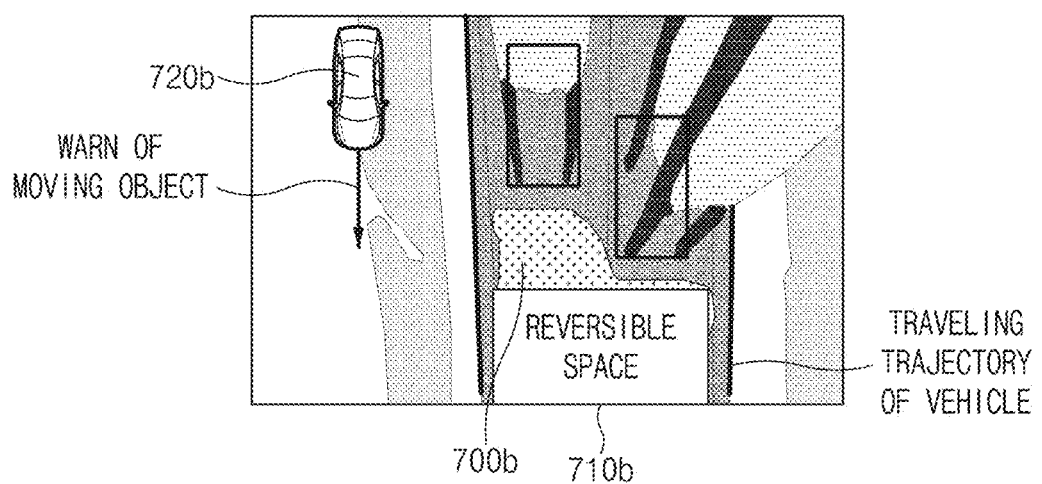

FIGS. 7A and 7B illustrate an example of determining whether it is possible for a moving object to enter a reversible space using a rear side image of a vehicle in a vehicle collision avoidance device and a method therefor according to an embodiment of the present disclosure.

Referring to FIG. 7A, in the vehicle collision avoidance device and the method therefor according to an embodiment, a vehicle may calculate a traveling trajectory of the vehicle using a sensor provided in the vehicle. For example, the sensor provided in the vehicle may include at least one of a steering wheel motion sensor, a distance sensor, a position sensor, or a combination thereof.

According to an embodiment, the processor may calculate a reversible space 710a.

According to an embodiment, the processor may calculate the reversible space 710a, based on the calculated traveling trajectory of the vehicle.

According to an embodiment, the processor may determine the reversible space 710a that is a minimum area, which overlaps the traveling trajectory of the vehicle, in which the vehicle is able to travel, in an empty space 700a.

According to an embodiment, when it is determined that there is no obstacle at the rear side of the vehicle, the processor may determine the reversible space 710a of the vehicle based on the speed of the vehicle.

According to an embodiment, the processor may recognize a moving object 720a.

According to an embodiment, the processor may recognize the moving object 720a that is present at the rear side of the vehicle using clustering information obtained by means of image segmentation.

According to an embodiment, the processor may perform sensor fusion of the obstacle recognized by means of the camera and an obstacle recognized by means of a radar to identify a position of the moving object 720a.

According to an embodiment, when it is determined that the moving object 720a is able to enter the reversible space 710a, the processor may determine to perform at least one of a warning about a collision, braking, or a combination thereof.

Referring to FIG. 7B, in the vehicle collision avoidance device and the method therefor according to an embodiment, a vehicle may calculate a traveling trajectory of the vehicle using a sensor provided in the vehicle. For example, the sensor provided in the vehicle may include at least one of a steering wheel motion sensor, a distance sensor, a position sensor, or a combination thereof.

According to an embodiment, the processor may calculate a reversible space 710b.

According to an embodiment, the processor may calculate the reversible space 710b, based on the calculated traveling trajectory of the vehicle.

According to an embodiment, the processor may determine the reversible space 710b that is a minimum area, which overlaps the traveling trajectory of the vehicle, in which the vehicle is able to travel, in an empty space 700b.

According to an embodiment, the processor may recognize a moving object 720b.

According to an embodiment, the processor may recognize the moving object 720b that is present at the rear side of the vehicle using clustering information obtained by means of image segmentation.

According to an embodiment, the processor may perform sensor fusion of the obstacle recognized by means of the camera and an obstacle recognized by means of a radar to identify a position of the moving object 720b.

According to an embodiment, when it is determined that the moving object 720b is unable to enter the reversible space 710b, the processor may determine not to perform at least one of a warning about a collision, braking, or a combination thereof.

Figure 8A:
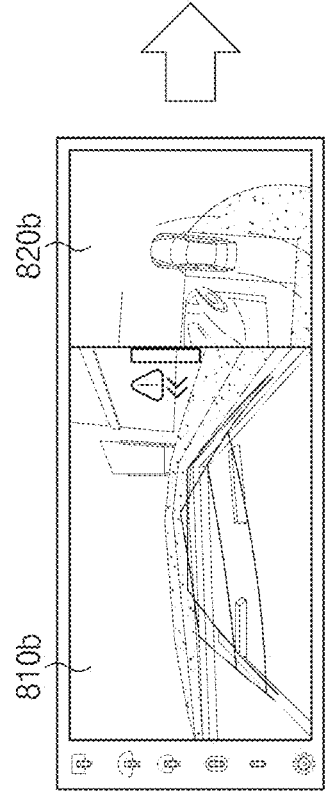
FIGS. 8A and 8B illustrate an embodiment of determining whether to warn of a collision with a moving object using a rear side image of a vehicle in a vehicle collision avoidance device and a method therefor according to an embodiment of the present disclosure.
Figure 8B:
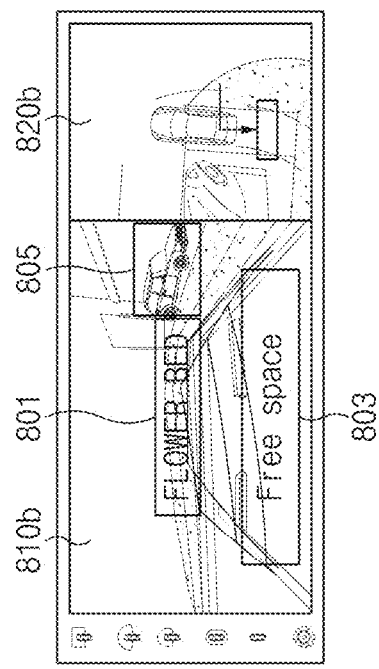

FIGS. 8A and 8B illustrate an embodiment of determining whether to warn of a collision with a moving object using a rear side image of a vehicle in a vehicle collision avoidance device and a method therefor according to an embodiment of the present disclosure. Contents in FIGS. 8A and 8B, which are duplicated with or correspond to the contents described above in conjunction with contents of FIGS. 1-7, may be briefly described or omitted.

Referring to FIG. 8A, in the vehicle collision avoidance device and the method therefor according to an embodiment, a processor may output a rear-view image 810b obtained by means of a camera through an output device (e.g., a display) provided in a vehicle.

According to an embodiment, the processor may output a top-view image 820b into which the rear-view image 810b is converted, through the output device (e.g., the display) provided in the vehicle.

According to an embodiment, the processor may output the rear-view image 810b and the top-view image 820b together, through the output device.

Referring to FIG. 8B, in the vehicle collision avoidance method according to an embodiment, the processor may determine whether there is a static object 801 at the rear of the vehicle, based on a rear-view image 810b obtained by means of a camera.

According to an embodiment, the processor may obtain the rear-view image 810b of the vehicle by means of the rear-view camera, in response to when the gear of the vehicle is set to the R) stage.

According to an embodiment, the processor may convert the rear-view image 810b obtained by means of the camera to obtain the top-view image 820b.

According to an embodiment, the processor may perform image segmentation in the top-view image 820b to determine whether there is the static object 801 at the rear of the vehicle.

According to an embodiment, when there is the static object 801 at the rear of the vehicle, the processor may determine a position of the static object 801 that is present at the rear of the vehicle.

According to an embodiment, the processor may perform sensor fusion of the rear-view image 810b collected in real-time by means of the camera and data collected in real-time by means of a radar to determine the position of the static object 801.

According to an embodiment, the processor may determine an empty space 803 that is present in the direction of travel of the vehicle, based on the rear-view image 810b obtained by means of the camera and the position of the static object 801.

According to an embodiment, when a moving object 805 outside the empty space 803 is detected, the processor may determine whether to warn of a collision, based on the moving object 805 and the static object 801.

According to an embodiment, the processor may determine whether to warn of a collision, based on a distance from the moving object 805 and a distance from the static object 801.

For example, when the distance from the static object 801 is less than the distance from the moving object 805, the processor may determine not to warn of the collision.

In another example, when the distance from the static object 801 is greater than the distance from the moving object 805, the processor may determine to warn of the collision.

According to an embodiment, the processor may determine a reversible space, which is a minimum area, which overlaps a traveling trajectory of the vehicle, in which the vehicle is able to travel, in the empty space 803.

According to an embodiment, when it is determined that the moving object 805 is able to enter the reversible space, the processor may determine to warn of the collision.

According to an embodiment, when it is determined that the moving object 805 is unable to enter the reversible space, the processor may determine not to warn of the collision.

Figure 9A:
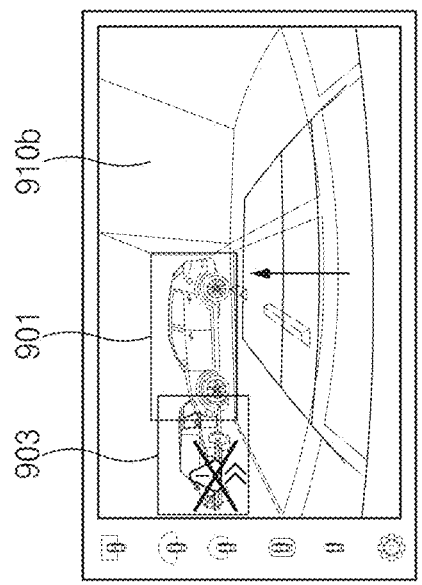
FIGS. 9A and 9B illustrate another embodiment of determining whether to warn of a collision with a moving object using a rear side image of a vehicle in a vehicle collision avoidance device and a method therefor according to an embodiment of the present disclosure.
Figure 9B:
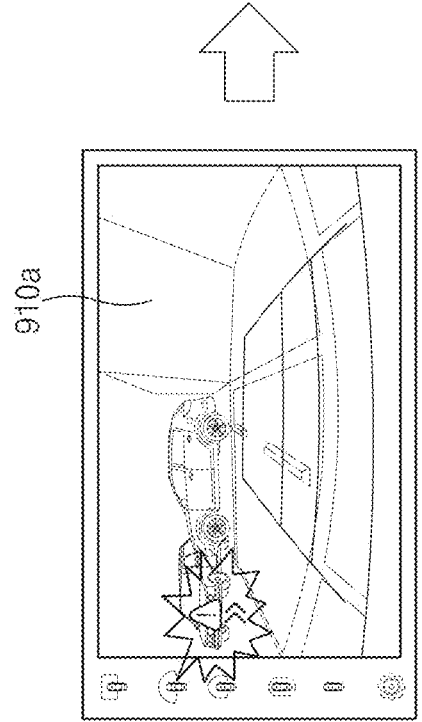

FIGS. 9A and 9B illustrate another embodiment of determining whether to warn of a collision with a moving object using a rear side image of a vehicle in a vehicle collision avoidance device and a method therefor according to an embodiment of the present disclosure.

FIG. 9A illustrates that a false warning is generated, because of not determining whether to warn of a collision based on a static object and a moving object. The static object and moving object are present at a rear side of a vehicle in a rear side image 910a obtained by means of a camera in the vehicle.

Referring to FIG. 9B, in the vehicle collision avoidance device and the method therefor according to an embodiment, a processor may determine whether there is a static object 901 at a rear side of the vehicle, based on a rear side image 910b obtained by means of a camera.

According to an embodiment, the processor may perform sensor fusion of the rear side image 910b obtained by means of the camera and data obtained by means of a radar to determine a position of the static object 901 that is present at the rear side of the vehicle.

According to an embodiment, the processor may detect a moving object 903, based on the rear side image 910b obtained by means of the camera.

According to an embodiment, the processor may perform sensor fusion of the rear side image 910b obtained by means of the camera and the data obtained by means of the radar to determine a position of the moving object 903 that is present at the rear side of the vehicle.

According to an embodiment, the processor may determine whether to warn of a collision, based on the moving object 903 and the static object 901.

For example, in a state where the gear is set to the R stage, when it is determined that a distance from the moving object 903 is shorter than a distance from the static object 901, the processor may output a warning through an output device.

For example, in the state where the gear is set to the R stage, when it is determined that the distance from the moving object 903 outside an empty space is longer than the distance from the static object 901, the processor may fail to output a warning through the output device.

According to the above-mentioned embodiment, the vehicle collision avoidance device according to an embodiment of the present disclosure may fuse the radar with the camera sensor to determine whether to warn of a collision, thus improving the performance of determining the warning.

Figure 10:
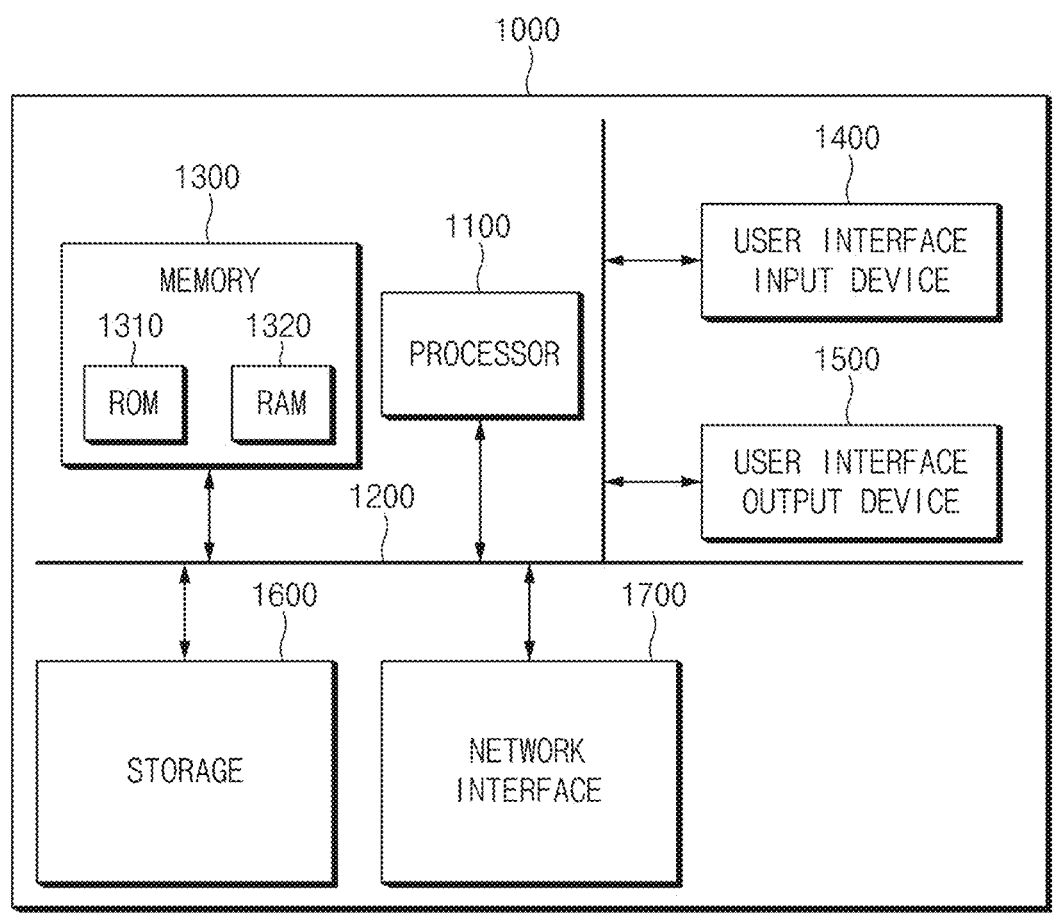
FIG. 10 illustrates a computing system about a vehicle collision avoidance device and a method therefor according to an embodiment of the present disclosure.

FIG. 10 illustrates a computing system about a vehicle collision avoidance device and a method therefor according to an embodiment of the present disclosure.

Referring to FIG. 10, a computing system 1000 for the vehicle collision avoidance device and the method therefor may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read-Only Memory) 1310 and a RAM (Random-Access Memory) 1320.

Accordingly, the operations of the method or algorithm described in connection with the embodiments disclosed in the specification may be directly implemented with a hardware module, a software module, or a combination of the hardware module and the software module, which are executed by the processor 1100. The software module may reside on a storage medium (i.e., the memory 1300 and/or the storage 1600) such as a random-access memory (RAM), a flash memory, a read-only memory (ROM), an erasable programmable ROM (EPROM), an electrically erasable programmable ROM (EEPROM), a register, a hard disc, a removable disk, and a compact disc ROM (CD-ROM).

The storage medium may be coupled to the processor 1100. The processor 1100 may read out information from the storage medium and may write information in the storage medium. Alternatively, the storage medium may be integrated with the processor 1100. The processor and the storage medium may reside in an application-specific integrated circuit (ASIC). The ASIC may reside within a user terminal. In another case, the processor and the storage medium may reside in the user terminal as separate components.

A description is given of effects of the vehicle collision avoidance device and the method therefor according to an embodiment of the present disclosure.

According to at least one of embodiments of the present disclosure, the vehicle collision avoidance device may prevent an unnecessary false warning of a rear cross-traffic collision-avoidance assist (RCCA) system.

Furthermore, according to at least one of embodiments of the present disclosure, the vehicle collision avoidance device may fuse a radar with a camera sensor and may determine whether to warn of a collision, thus improving system detection performance.

In addition, various effects ascertained directly or indirectly through the present disclosure may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but are provided only for illustrative purposes. The scope of the present disclosure should be construed based on the accompanying claims. All the technical ideas within the scope equivalent to the claims should be included in the scope of the present disclosure.

What is claimed is:

1. A vehicle collision avoidance device comprising:
    a camera configured to capture a rear side image of a vehicle;
    a radar configured to recognize an object present at a rear side of the vehicle; and
    at least one processor electrically connected to the camera and the radar,
    wherein the at least one processor
        determines whether there is a static object at the rear side of the vehicle based on the rear side image obtained by the camera,
        determines a position of the static object at the rear side of the vehicle when the static object is determined to be at the rear side of the vehicle,
        determines an empty space present in a direction of travel of the vehicle, based on the rear side image obtained by the camera and the position of the static object,
        determines whether to warn of a collision, based on a moving object outside the empty space and the static object, when the moving object is detected, and
        determines not to warn of the collision when the moving object is determined to be unable to enter a reversible space due to a position of the static object that is located between the vehicle and the moving object.

2. The vehicle collision avoidance device of claim 1, wherein the at least one processor
    determines not to warn of the collision when a distance from the static object is less than a distance from the moving object, and
    determines to warn of the collision when the distance from the static object is greater than the distance from the moving object.

3. The vehicle collision avoidance device of claim 1, wherein the at least one processor
    determines the reversible space in the empty space, the reversible space being a minimum area in which the vehicle is able to travel, the minimum area overlapping a traveling trajectory of the vehicle, and
    determines to warn of the collision when the moving object is determined to be able to enter the reversible space.

4. The vehicle collision avoidance device of claim 3, wherein the at least one processor determines the reversible space of the vehicle based on a speed of the vehicle when it is determined that there is no static object at the rear side of the vehicle.

5. The vehicle collision avoidance device of claim 3, further comprising a brake system, wherein the at least one processor
    controls the brake system to brake when it is determined that the moving object is able to enter the reversible space, and
    controls the brake system not to brake when it is determined that the moving object is unable to enter the reversible space.

6. The vehicle collision avoidance device of claim 1, wherein the at least one processor determines whether the static object is at the rear side of the vehicle, based on the rear side image obtained by the camera, when a gear of the vehicle is set to a reverse (R) stage and when a speed of the vehicle is within a specified range.

7. The vehicle collision avoidance device of claim 6, wherein the at least one processor determines whether to warn of the collision, based on the moving object and the static object, when a speed of the moving object is greater than or equal to a threshold.

8. The vehicle collision avoidance device of claim 1, wherein the at least one processor
    converts the rear side image obtained by the camera to obtain a top-view image, and determines whether the static object is at the rear side of the vehicle based on image segmentation in the top-view image.

9. The vehicle collision avoidance device of claim 1, wherein the at least one processor
performs sensor fusion of a rear side image collected in real-time by the camera and data collected in real-time by the radar, and
determines a position of at least one of the static object present at the rear side of the vehicle, the moving object, or a combination thereof.

10. The vehicle collision avoidance device of claim 1, further comprising an output device,
wherein the at least one processor controls the output device to output a warning when the at least one processor determines to warn of the collision, and
wherein the output device includes at least one of a cluster, displays provided in side mirrors, a speaker, or a combination thereof.

11. A vehicle collision avoidance method comprising:
determining, by at least one processor, whether there is a static object at a rear side of a vehicle based on a rear side image obtained by a camera;
determining, by the at least one processor electrically connected to the camera, a position of the static object at the rear side of the vehicle when the static object is determined to be at the rear side of the vehicle;
determining, by the at least one processor, an empty space present in a direction of travel of the vehicle, based on the rear side image obtained by the camera and the position of the static object; and
determining, by the at least one processor, whether to warn of a collision, based on a moving object outside the empty space and the static object, when the moving object is detected
wherein the determining of whether to warn of the collision includes determining, by the at least one processor, not to warn of the collision when the moving object is determined to be unable to enter a reversible space due to a position of the static object that is located between the vehicle and the moving object.

12. The vehicle collision avoidance method of claim 11, further comprising:
determining, by the at least one processor, not to warn of the collision when a distance from the static object is less than a distance from the moving object; and
determining, by the at least one processor, to warn of the collision when the distance from the static object is greater than the distance from the moving object.

13. The vehicle collision avoidance method of claim 11, wherein the determining of whether to warn of the collision includes:
determining, by the at least one processor, the reversible space in the empty space, the reversible space being a minimum area in which the vehicle is able to travel, the minimum area overlapping a traveling trajectory of the vehicle; and
determining, by the at least one processor, to warn of the collision when the moving object is determined to be able to enter the reversible space.

14. The vehicle collision avoidance method of claim 13, further comprising determining, by the at least one processor, the reversible space of the vehicle based on a speed of the vehicle when it is determined that there is no static object at the rear side of the vehicle.

15. The vehicle collision avoidance method of claim 13, further comprising:
controlling, by the at least one processor, a brake system to brake when it is determined that the moving object is able to enter the reversible space; and
controlling, by the at least one processor, the brake system not to brake when it is determined that the moving object is unable to enter the reversible space.

16. The vehicle collision avoidance method of claim 11, wherein the determining of whether the static object is at the rear side of the vehicle includes determining, by the at least one processor, whether the static object is at the rear side of the vehicle, based on the rear side image obtained by the camera, when a gear of the vehicle is set to a reverse (R) stage and when a speed of the vehicle is within a specified range.

17. The vehicle collision avoidance method of claim 16, wherein the determining of whether to warn of the collision includes determining, by the at least one processor, whether to warn of the collision, based on the moving object and the static object, when a speed of the moving object is greater than or equal to a threshold.

18. The vehicle collision avoidance method of claim 11, wherein the determining of whether the static object is at the rear side of the vehicle includes:
converting, by the at least one processor, the rear side image obtained by the camera to obtain a top-view image; and
determining, by the at least one processor, whether the static object is at the rear side of the vehicle by performing image segmentation in the top-view image.

19. The vehicle collision avoidance method of claim 11, further comprising:
performing, by the at least one processor, sensor fusion of a rear side image collected in real-time by the camera and data collected in real-time by a radar; and
determining, by the at least one processor, a position of at least one of the static object present at the rear side of the vehicle, the moving object, or a combination thereof.

20. The vehicle collision avoidance method of claim 11, further comprising controlling, by the at least one processor, an output device to output a warning when the at least one processor determines to warn of the collision,
wherein the output device includes at least one of a cluster, displays provided in side mirrors, a speaker, or a combination thereof.

* * * * *